US012621516B2

(12) United States Patent
Dolan et al.

(10) Patent No.: US 12,621,516 B2
(45) Date of Patent: *May 5, 2026

(54) SYSTEMS AND METHODS FOR SECURE UPDATES

(71) Applicant: CABLE TELEVISION LABORATORIES, INC., Louisville, CO (US)

(72) Inventors: Andrew Alexander Dolan, Denver, CO (US); Brian A. Scriber, Lafayette, CO (US); Massimiliano Pala, Longmont, CO (US); Steven J. Goeringer, Westminster, CO (US); Yuan Tian, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/815,610

(22) Filed: Aug. 26, 2024

(65) Prior Publication Data

US 2024/0422375 A1     Dec. 19, 2024

Related U.S. Application Data

(63) Continuation of application No. 17/568,964, filed on Jan. 5, 2022, now Pat. No. 12,075,107.

(60) Provisional application No. 63/273,354, filed on Oct. 29, 2021, provisional application No. 63/182,079, filed on Apr. 30, 2021, provisional application No. 63/133,871, filed on Jan. 5, 2021.

(51) Int. Cl.
*H04N 21/262* (2011.01)
*G06F 8/65* (2018.01)
*H04L 9/40* (2022.01)

(52) U.S. Cl.
CPC ......... *H04N 21/26291* (2013.01); *G06F 8/65* (2013.01); *H04L 63/0823* (2013.01); *H04L 63/0869* (2013.01)

(58) Field of Classification Search
None
See application file for complete search history.

(56) References Cited

U.S. PATENT DOCUMENTS

2018/0375730 A1   12/2018   Anand et al.
2022/0070178 A1   3/2022    Lee et al.

*Primary Examiner* — Omar S Parra
(74) *Attorney, Agent, or Firm* — Armstrong Teasdale LLP

(57) ABSTRACT

A computer device is provided for performing secure updates and notifications. The computer device includes a transceiver configured for operable communication with an operator computer device of a communication network via a connection with a vendor computer device, and a first processor having a first memory device configured to store computer-executable instructions, which cause the first processor to (i) store a plurality of registration information for the operator computer device, which is registered for notifications for one or more device types, (ii) receive, from the vendor computer device, an update notification message associated with devices of a first device type, (iii) determine a link to update materials associated with the update notification message, (iv) determine additional operator computer devices that are registered to receive updates for the first device type, and (v) transmit, to the additional operator computer devices, an update notification message including the link to the update materials.

20 Claims, 5 Drawing Sheets

100

SYSTEMS AND METHODS FOR SECURE UPDATES

CROSS REFERENCE TO RELATED APPLICATIONS

This application is a continuation of U.S. patent application Ser. No. 17/568,964, filed Jan. 5, 2022, which application claims the benefit of and priority to U.S. Provisional Patent Application No. 63/133,871, filed Jan. 5, 2021, and U.S. Provisional Patent Application No. 63/273,354, filed Oct. 29, 2021, and U.S. Provisional Patent Application No. 63/182,079, filed Apr. 30, 2021, which are hereby incorporated by reference in their entireties.

BACKGROUND

The field of the disclosure relates generally to secure updates, and more particularly, to systems and methods for providing secure and trusted updates to systems and devices.

As with many ecosystems, the use of a secure update mechanism is critical to the security of devices and their connected networks. While there already exist secure update practices that operators apply to network elements such as cable modems (e.g., DOCSIS cable modem secure software download), there is no standard process by which vendors provide update materials (e.g., images, configuration data) to operators that provides optimal efficiency and security. Additionally, the wide variety of devices and network elements that require update services as well as the diverse vendor community results in a complex space in which it may be difficult for an operator to provide comprehensive and sufficiently secure support of update practices across all devices in the network.

Furthermore, there may be multiple different devices on the network which will require the operator to monitor each device type or individual device for updates. Furthermore, different operators of different networks may have varying levels of support, varying levels of turnover of support staff, can change as businesses change hands, and can even include home networks. Updates are a pivotal aspect of security for patching vulnerabilities and for securely providing new features. However, there is currently no standard update solution or even a standard scope for the update lifecycle as each vendor creates and/or uses their own process.

However, efficiency is particularly critical when it comes to update processes, and not all current practices may support secure automation that enables efficient provisioning of updates. To ensure that updates are consistently provided to any and all devices and network elements under the management of an operator, and to ensure that an update mechanism that is secure is the most convenient to use, a standardized approach is needed to ensure that devices are consistently and efficiently kept up to date.

SUMMARY

In an embodiment, a Trusted Update Repository and Notifier (TURN) computing device is provided for performing secure updates and notifications. The computing device includes a transceiver configured for operable communication with at least one operator computer device of a communication network and via an operable connection with at least one vendor computer device. The computing device further includes a first processor having a first memory device configured to store computer-executable instructions.

When executed by the first processor, the instructions cause the first processor to (i) store a plurality of registration information for the at least one operator computer device, wherein the at least one operator computer device is registered for notifications for one or more device types, (ii) receive, from a first vendor computer device, an update notification message associated with devices of a first device type, (iii) determine a link to update materials associated with the update notification message, (iv) determine one or more additional operator computer devices that are registered to receive updates for the first device type, and (v) transmit, to the determined one or more additional operator computer devices, one or more update notification messages including the link to the update materials.

BRIEF DESCRIPTION

These and other features, aspects, and advantages of the present disclosure will become better understood when the following detailed description is read with reference to the following accompanying drawings, in which like characters represent like parts throughout the drawings.

Figure 1:
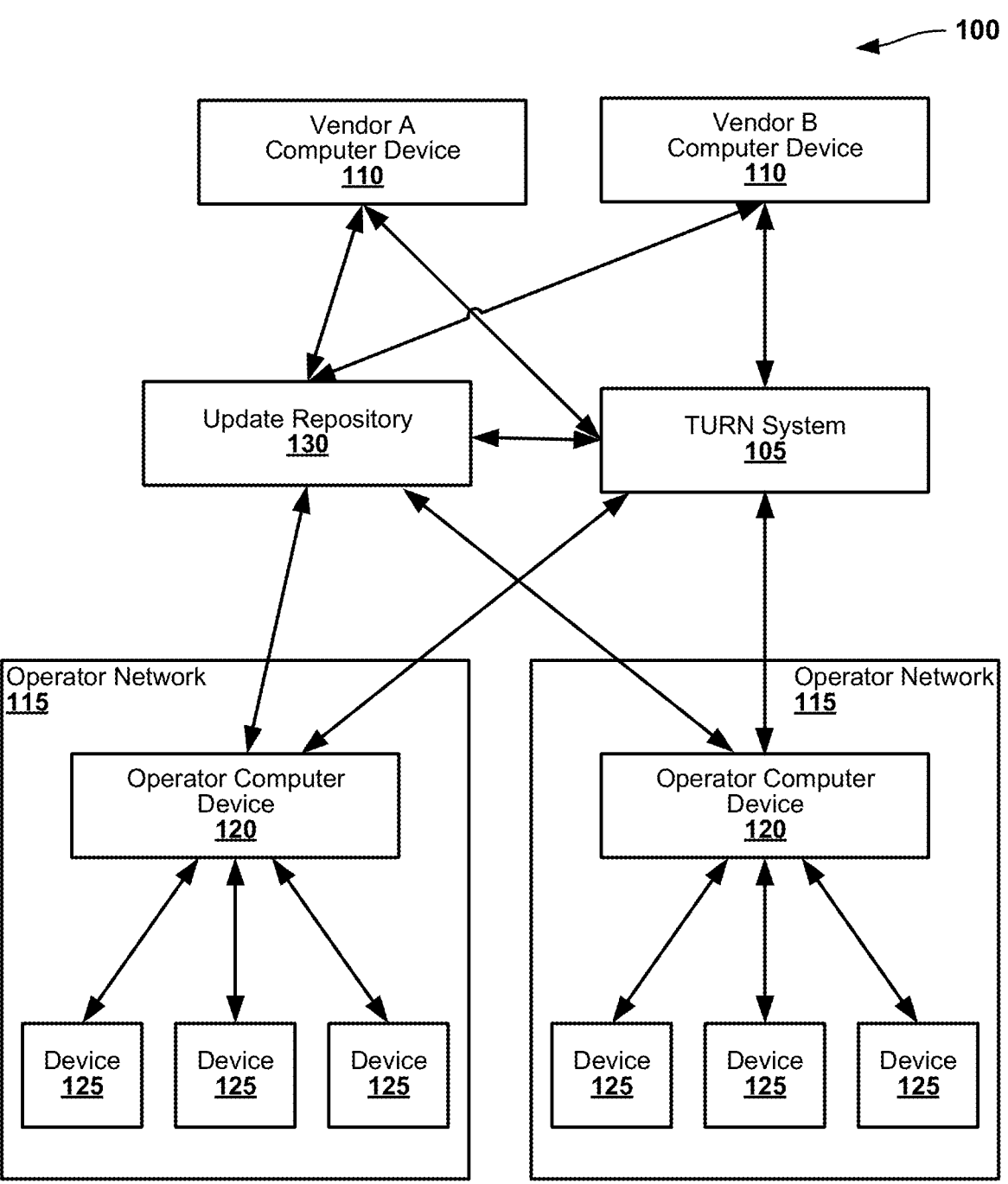
FIG. 1 illustrates a block diagram of a first system architecture for providing secure updates to devices in accordance with at least one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate and issuing digital certificates that certify the ownership of a public key by the named subject of the certificate. CA may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

The person of ordinary skill in the art will understand that the term "wireless," as used herein in the context of optical transmission and communications, including free space optics (FSO), generally refers to the absence of a substantially physical transport medium, such as a wired transport, a coaxial cable, or an optical fiber or fiber optic cable.

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As used herein, the term "data center" generally refers to a facility or dedicated physical location used for housing electronic equipment and/or computer systems and associated components, e.g., for communications, data storage, etc. A data center may include numerous redundant or backup components within the infrastructure thereof to provide power, communication, control, and/or security to the multiple components and/or subsystems contained therein. A physical data center may be located within a single housing facility, or may be distributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thousands of physical servers connected by a high-speed network.

As used herein, the term "hyperscale" refers to a computing environment or infrastructure including multiple computing nodes, and having the capability to scale appropriately as increased demand is added to the system, i.e., seamlessly provision infrastructure components and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and a "distance" between nodes may be physical or perceptual. A hyperscale datacenter may include several performance optimized datacenters (PODs), and each POD may include multiple racks and hundreds and thousands of compute and/or storage devices.

The field of the disclosure relates generally to secure updates, and more particularly, to systems and methods for providing secure and trusted updates to systems and devices.

Update mechanisms are critical to device and infrastructure security, both for the ability to quickly patch discovered vulnerabilities and to ensure that updates are securely applied without fear of tampering. With the wide variety of vendors and the diversity of devices and network elements in a network, such as a cable network, there exist great challenges in discovering the updates, supporting the update processes, and ensuring that secure update mechanisms are in place for all elements under operator management. To minimize these complexities as they apply to updates for cable networks or other networks, the concept of a Trusted Update Repository and Notifier (TURN) solution is disclosed herein.

In the exemplary embodiment, a TURN system is a logical entity that establishes trust relationships between the operators (and their devices) and the vendors (and the updates that they produce). The TURN system described herein facilitates the efficient and secure provisioning of updates for any number of devices. Through the use of a publish/subscribe architecture, vendors are able to push signed update materials to a TURN system, which subsequently notifies the operator of updates applicable to devices under their management. The TURN system ensures that updates are delivered efficiently and securely, such that operators and devices have assurances of the authenticity and integrity of any update that is backed by PKI. The TURN system architecture additionally provides functionality to notify operators of discovered vulnerabilities and allows for the seamless transfer of update development responsibility from one vendor to another.

As described herein, the Trusted Update Repository and Notifier (TURN) system provides a secure and standardized process for vendors of any device, network element, software program, or other updatable entity to publish updates, and for operators to be notified of those updates that are applicable to their deployed devices. The TURN system uses strong identity in the form of PKI to established trust relationships between the key entities of the architecture, such that the operator can assert trust in both the TURN system and the vendor, the TURN system can assert trust in both the operator and the vendor, and the vendor can assert trust in both the TURN system and the operator.

The TURN system, as it is described herein, presents a standard process for securely provisioning updates to any devices that require them. This process can be used by cable providers and network operators, as well as institutions, such as, but not limited to, businesses, schools, and hospitals, as well as by individuals. As long as the necessary trust relationships are established in a deployment, any practitioner or device can subscribe to the TURN system for updates to be applied to deployed devices. Furthermore, any device that implements the TURN system will be able to be verify and apply provisioned updates efficiently and securely.

Regardless of vendor or device, the TURN system provides a consistent repository to which new updates can be published for subsequent distribution within operator networks or other networks. Operators can interact with a TURN system by establishing subscriptions for the devices that they wish to receive updates for. When a vendor pushes an update to the TURN system, the TURN system notifies any operator(s) that have established a subscription relevant to the pushed update. The TURN system alerts the operators that the update is available and indicates where the operators can fetch the update. At this point, operators can, in an automated fashion, fetch the update and provision it to the relevant devices within their network. If desired, operators can leverage existing processes for provisioning updates throughout the network.

In some embodiments, subscriptions to a TURN system could also be established directly by individual devices, where the individual devices would effectively leverage the TURN system as their primary update service.

As a TURN system is a logical entity, there could be many different deployment options, including, but not limited to, as a centralized system, under the internal management of a single entity or operator, under the management of a cohort of entities or operators, and/or as a fully distributed, open source entity managed by users through P2P (peer to peer) networking. The deployment architecture could also include the use of multiple TURN systems that communicate with each other, allowing for broader coverage of supported updates. For example, if one TURN system is unfamiliar with a particular device, it could communicate with another TURN system under different management that is familiar with the updates to be provisioned to that device.

Additionally, the TURN system could be used to provision update materials of many different types, including, but not limited to: firmware or software images, patches or packages, executables, encrypted proprietary update materials, such as those readable only by end devices, configuration data, models, and/or container images. The TURN system is effectively agnostic to what the actual materials being updated are. The TURN system primarily provides a system for trusted devices that have subscribed to notification for relevant update materials are supplied by trusted parties. The subscribers can then apply the provided update materials in accordance with their update procedures.

To allow for different variations of update materials, different update frequencies, different update priorities, and more, the TURN system can be configured with multiple "channels." Depending on which the TURN system channel a device subscribes to, the device may receive different update materials or notifications at different frequencies. For example, some devices may be configured to subscribe to a "fast" channel, which always provides update materials as soon as they are available, while other device may subscribe to a "stable" channel that only receives updates that are deemed stable for wide distribution. In this way, practitioners and vendors are able to perform staggered rollouts of new updates through the TURN system, to enable testing phases.

Additionally, some channels may be configured to provide different kinds of update materials. For example, a device may have the option to subscribe to a channel that provides only configuration data, a channel that provides only software images, or a channel that provides both.

In some embodiments, the TURN system does not serve as the point at which update materials are actually stored. In these embodiments, the TURN system instead provide links to where update materials may be fetched, as well as data with which update materials can be authenticated, such as signatures and material hashes. This ensures that proprietary update materials are kept confidential while leveraging the TURN system to maintain their authenticity and integrity as the update materials are fetched and applied by devices.

To ensure the authenticity and integrity of the update materials, the TURN system can present authenticity and integrity information about update materials as a Merkle tree. In this structure, the leaves are cryptographic hashes of the various update materials that constitute an update. The root of the Merkle tree is then signed by the TURN system (and can additionally be co-signed by vendors and/or operators). As new updates are pushed to the TURN system, new Merkle trees would be created and signed ahead of distribution to and verification by devices.

This scheme allows for the integrity and authenticity of updates to be verified through a single hash, and for any unexpected differences in update materials to be quickly localized. This single point of verification for a particular version of the update materials also ensures that different update versions are cryptographically distinct, regardless of how many or which components differ between the versions.

Ensuring that updates are timely is critical to the security of any computer-based infrastructure, as is ensuring that updates are authentic and have not been tampered with. To achieve these goals, trust relationships between operators, TURN systems, and vendors are established through the use of PKI. That is, all communications with a TURN system are mutually authenticated, and access controls are exercised where appropriate to ensure that proprietary update materials are only accessed by authorized entities. Furthermore, the mutual authentication with the TURN system can allow the operators and/or vendors to become authenticated with the repositories. In some of these embodiments, the TURN system and the repositories have the same authentication procedures and credentials. In other embodiments, the TURN system provides the required credentials to authenticate with the repository. The authentication credential information from the TURN system may only allow the operator and/or vendor to access a specific portion, location, and/or file from the repository.

From the perspective of devices that receive updates, ultimate trust in the origin of updates to be applied is crucial. Accordingly, vendors must sign their updates such that trust in their authenticity and integrity can be established by the device at update time. Similarly, operators who fetch updates from a TURN system perform necessary authentication of the TURN system and verify the authenticity and integrity of the update to be applied. These trust relationships aim to ensure that updates can be trusted throughout their entire development and distribution lifecycle.

In addition to the standard facilitation of updates across a variety of vendors and devices, the TURN system can also be used to facilitate the transfer of update development responsibility between vendors, and to notify operators of security vulnerabilities and actions to resolve them.

When devices or network elements are meant to be deployed in the field for long periods of time, it is important to ensure that updates will be provided consistently and securely, regardless of changes in product ownership or development teams. Ideally, from the perspective of any device, produced updates can be applied and trusted regardless of the vendor or development team from which they originate. The TURN system can help facilitate the seamless transfer of product update responsibility. The TURN system manages which vendor is responsible for updating which variant(s) of a device. For example, if a particular product and its update development fall under a different vendor, the use of PKI can ensure that updates developed under the new vendor are still trusted by the TURN, the operator, and the corresponding device. From a process perspective, after the responsibility of producing updates has changed between vendors, the new development team is able to simply push new updates to the TURN system, just as the previous team did. Similarly, the TURN system could act formally as a third party escrow agent for updates.

When vulnerabilities are discovered in specific or recently released versions of various devices, efficiently rolling back or updating to a new version is crucial. With the TURN system, a vendor who has discovered such a vulnerability can provide a notification that the TURN system relays to the operators and/or devices. The TURN system can also relay an execution plan that operators can use to either roll back or update their devices. When the TURN system receives such a notification, the TURN system ensures that the vulnerable update version is flagged so that vulnerable version is not used further by any devices that could otherwise be updated to that version. Simultaneously, the TURN system notifies operators of the faulty version with the same publish/subscribe architecture that is regularly used to provide notifications of updates. This notification additionally details which version operators should provide to the affected devices, whether it is a new update provided by the vendor after the faulty update, or a previous version that came before the faulty update. In either case, the TURN system acts as a critical point through which vendors can provide this information and ensure that affected devices are protected. This is a significant improvement to notifying individual operators and having the operators manually distribute the fix to the affected devices.

In the case that a particular version of an update is deemed vulnerable (or otherwise obsolete) and should no longer be used by devices, the TURN system can manage the update obsolescence information. In one approach, vulnerable versions of update materials (and their corresponding authenticity and integrity information) are stored by the TURN system, but are marked as vulnerable. In another approach, the TURN system actively "forgets" (deletes or removes) these vulnerable versions so that they will not be used. In these embodiments, the TURN system could store placeholders indicating that a version exists, but that it is vulnerable.

In the first approach, when a vulnerable device subscribes to the TURN system, the TURN system may directly recognize that the device leverages a vulnerable version and require it to update or rollback. In the second approach, the TURN system reaches the same conclusion by not having any record of the current version leveraged by the vulnerable device.

In either case, when devices are to be notified that they must update or roll back to a previous version due to a vulnerability, the TURN system executes the notification action as it would with any typical update, optionally with an additional flag that marks the notification as critical. From the device perspective, a set of update materials is fetched, the update material's integrity and authenticity are verified, and the update is applied, whether it is new or a previous version.

In the exemplary embodiment, the TURN system acts as a trust anchor between vendors and devices. The TURN system can also support any number of practitioners (e.g., operators) in between. Accordingly, the TURN system can act as a mediator between different trust domains, allowing vendors and practitioners to have a transitive trust relationship facilitated through the TURN system.

For example, existing PKI architectures can be leveraged to establish a trust relationship with the TURN system. An operator may have one such architecture, and a vendor may have another. Each party respectively establishes a trust relationship with the TURN system through their architecture. When a vendor publishes a signed update to the TURN system, the TURN system co-signs the update integrity materials, enabling the operator to verify their contents without participating in the vendor's PKI or vice-versa.

In this architecture, each party that leverages the TURN system for updates is able to have trust in the update materials at each step in their lifecycle. The TURN system has trust in the signature provided by the vendor that produced the update materials, the Operator has trust in the signature that the TURN system applied to the update materials, and the device(s) can have trust in the signature applied by the Operator, the Vendor, the TURN system, or any combination of all three.

Ensuring that updates are timely applied is critical to the security of an infrastructure, as is ensuring that updates are authentic and have not been tampered with. To achieve these goals, trust relationships between operators, TURN systems, and vendors are established through the use of PKI. That is, all communications with a TURN system are mutually authenticated, and access controls are exercised where appropriate to ensure that proprietary update materials are only accessed by authorized entities.

From the perspective of devices that receive updates, ultimate trust in the origin of updates to be applied is crucial. Accordingly, vendors must sign their updates such that trust in their authenticity and integrity can be established by the device at update time. Similarly, operators who fetch updates from a TURN system perform the necessary authentication of the TURN system and verify the authenticity and integrity of the update to be applied. These trust relationships aim to ensure that updates can be trusted throughout their entire development and distribution lifecycle. Considering its position and functional roles within the architecture, the TURN system requires strong security measures to ensure trust in a TURN and the operations it manages.

The embodiments described herein provide innovative systems and methods for managing and allocating updates to devices. The embodiments described herein further provide systems and methods for managing and allocating updates to those devices in a secure manner. In an exemplary embodiment, the TURN system interfaces between the vendors and the client devices on a network. In an exemplary embodiment, the TURN system serves to function as a protective interface, or "midbox", for securely protecting the distribution of updates.

FIG. 1 illustrates a block diagram of a first system architecture 100 for providing secure updates to devices 125 in accordance with at least one embodiment. In the exemplary embodiment, a Trusted Update Repository and Notifier (TURN) system 105 is in communication with one or more vendor computer devices 110 each associated with a vendor. In the exemplary embodiment, communicates with the TURN system 105 are done through mutually authenticated communication channels.

The TURN system 105 is configured to provide update services to operator networks 115 and to individual devices 125. Vendor computer devices 110 push updates to the TURN system 105. The TURN system 105 notifies the operators of the updates for the relevant devices 125. The TURN system 105 can also notify operators of problematic updates that should be rolled back. The TURN system 105 securely provides the updates from the vendors to the operator networks 115 and their devices 125.

The TURN system 105 is in communication with a plurality of operator networks 115. In the exemplary embodiment, the operator network 115 is operated by a cable provider or other network provider. In still other embodiments, the operator network 115 can also be an institutional network, such as that for a factory and/or a hospital. The operator networks 115 have subscribed to the TURN system 105 for updates for one or more of the devices 125 in the operator network 115. In the exemplary embodiment, the operator network 115 includes a plurality of devices 125 from a plurality of vendors 110. The updates for these devices 125 may come from a plurality of different vendors 110. Furthermore, different devices 125 may have different update processes. The devices 125 may include, but are not limited to, network elements such as, but not limited to, modems, routers, switches, hubs, modem termination systems, DSL (digital subscriber line) modems, LTE (long term evolution) hotspots or modems, gateway routers, access points, OMUs (Operation and Maintenance Units), eNB (Evolved Node B), OLTs (Optical Line Terminals), etc.; commodity hardware such as, but not limited to, servers; software applications, and other devices 125 that can have either their firmware and/or their software updated, such as for security and/or features update patches.

Figure 2:
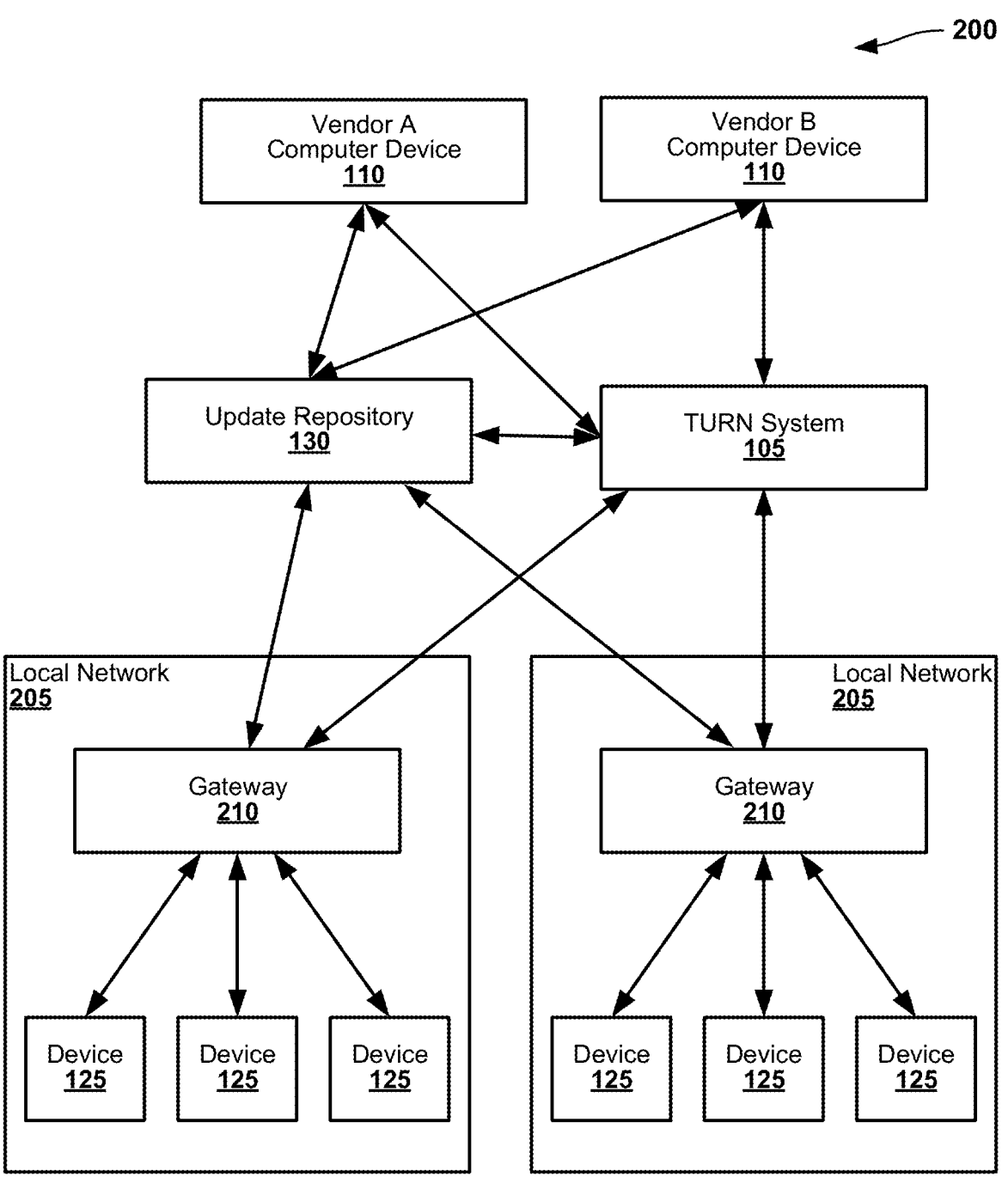
FIG. 2 illustrates a block diagram of a second system architecture for providing secure updates to devices in accordance with at least one embodiment.

The TURN system 105 receives messages from the vendor computer device 110 informing the TURN system 105 that the vendor has an update. In the exemplary embodiment, the update is stored in an update repository 130. In some embodiments, the update repository 130 is associated with and maintained by the vendor computer device 110. In these embodiments, the vendor computer device 110 provides information about the update including a link to where the update is stored to the TURN system 105. In other embodiments, the update repository 130 is associated with and maintained by the TURN system 105. In these embodiments, the vendor computer device 110 provides the update or a link to the update to the TURN system 105 and the TURN system 105 stores the provided update in its update repository 130. The update materials can include, but are not limited to, firmware or software images, patches or packages, executables, encrypted proprietary update materials, such as those readable only by end devices 125, configuration data, models, and/or container images. While only one update repository 130 is shown in FIGS. 1 and 2, there may be a plurality of update repositories 130 from which updates can be retrieved. For example, some vendors may have their own update repositories 130 and the TURN system 105 may include its own update repositories 130. Furthermore, different types of updates for different devices 125 may be stored in separate update repositories 130.

In the exemplary embodiment, the operator networks 115 have subscribed with the TURN system 105 to be updated when an update arrives for one or more of their devices 125. When the TURN system 105 receives an update notification from a vendor computer device 110, the TURN system 105 determines which operator networks 115 have subscribed to updates for that vendor and/or that device 125. The TURN system 105 transmits update notifications to the subscribed operator computer devices 120 associated with the subscribed operator networks 115.

The subscribed operator computer devices 120 reviews the received update notification. In some embodiments, the operator computer device 120 schedules an update for the affected devices 125 based on the update notification. In many embodiments, the devices 125 of the operator network

115 cannot be taken offline for updates until the operator computer device 120 confirms that the operator network 115 will still be fully supported and functional. Accordingly, the operator computer device 120 can schedule the update for a time when the network traffic is low and the device 125 can be taken offline to update. Furthermore, if there are multiple devices 125 that need that update, the operator computer device 120 can schedule the updates for the devices 125 to be performed serially or in batches so that only a limited number of devices 125 are offline for updates at a time.

Furthermore, the operator computer device 120 can also use special procedures for updating the devices 125, such as where the specific procedures are required by the devices 125 or the operator network 115 for security, quality of service, bandwidth, or other business or system reasons as required for the operator network 115.

In the exemplary embodiment, the TURN system 105 is provided and provides the update information including, but not limited to, version number, serial number range, device types, and model numbers, as well as other information to identify the devices to be updated and information about the update itself, such as what is being updated and any special instructions for applying the update. Furthermore, the TURN system 105 also provides a link to where the update materials are stored, such as in the update repository 130. In some embodiments, the TURN system 105 provides just the link to the update in the update repository 130 to decrease the amount of bandwidth used in reporting the update as well as allowing the operator computer device 120 to securely download the update when desired rather than taking up storage space before the devices 125 is ready to be updated.

In the exemplary embodiment, the communications between the vendor computer device 110 and the TURN system 105, as well as the communications between the TURN system 105 and the operator computer device 120 and/or the device 125 itself, are protected by mutual authentication between the devices, such as by using public key infrastructure (PKI). The mutual authentication and access controls ensure the authenticity and integrity of the updates. In these embodiments, the vendor signs their update, as well as signing the update notification, before providing the update to the update repository 130. The TURN system 105 can also sign or co-sign the update and/or the update notification. In some of these embodiments, the update is encrypted and the update notification includes the key and/or the location of the key to decrypt the update.

Furthermore, the mutual authentication with the TURN system 105 can allow the operator computer devices 120 and/or vendor computer devices 110 to become authenticated with the update repositories 130. In some of these embodiments, the TURN system 105 and the update repositories 130 have the same authentication procedures and credentials. In other embodiments, the TURN system 105 provides the required credentials to authenticate with the update repository 130. The authentication credential information from the TURN system 105 may only allow the operator computer device 120 and/or vendor computer device 110 to access a specific portion, location, and/or file from the update repository 130.

In the exemplary embodiment, there is a common root of trust between the different entities, the vendors, the TURN system 105, and the operator networks 115 and/or devices 125. All of the entities have a provisioned identity using PKI. The trust between the vendor and the TURN system 105 allows the vendor computer device 110 to push signed updates and notifications to the TURN system 105. Furthermore, the TURN system 105 can manage any revocation of trust in the vendors. The trust between the TURN system 105, the operator network 115 and/or devices 125 allows the TURN system 105 to sign the notifications and updates.

While the TURN system 105 is shown as a single box in FIG. 1, the TURN system 105 can include a plurality of computer devices. In at least one embodiment, different computer devices of the TURN system 105 track updates for different devices 125. For example, a first TURN computer device tracks updates for routers and is in communication with the vendor computer devices 110 to receive information about updates for those routers. When an update notification reaches the TURN system 105 from a vendor computer device 110, the TURN system 105 routes the information to the appropriate computer devices within the TURN system 105. In other embodiments, different TURN computer devices are associated with different geographic regions, where the TURN system 105 is copied to each region. The TURN system 105 can be configured to be centralized, decentralized, privately hosted, and/or publicly hosted. The TURN system 105 could be hosted by an operator, publicly hosted in a peer-to-peer style, hosted by a third party as a service, and/or any other style that allows the TURN system 105 to operate as described herein.

The TURN system 105 allows vendors to push updates in a standardized way and allows operators and/or devices 125 to receive updates in a standardized way. Furthermore, the operator computer device 120 can act as an interface to the devices 125 to handle older devices 125 that are not configured to communication with and/or recognize the TURN system 105. The TURN system 105 is designed to provide the updates as efficiently as possible. By having the updates stored in an update repository 130, the TURN system 105 efficiently uses the communication resources and bandwidth to only transmit the updates when they are needed and the receivers are ready for them. Furthermore, by having the devices 125 and/or operator computer device 120 request the update files, the update files go to the appropriate devices rather than being repeatedly transferred and/or stored. The TURN system 105 provides a simplified, consistent, and secure method for pushing updates to devices 125 and/or operator networks 115. In addition, the TURN system 105 supports a variety of types of updates including, but not limited to, monolithic, dynamic, and/or purely configuration. Furthermore, the TURN system 105 ensures that the update mechanism is not just secure, but also device driven. In the TURN system 105, the devices 125 are consistently and efficiently kept up to date, regardless of where the update comes from.

In different embodiments, the vendor computer device 110 can provide the update materials to the update repository 130 in multiple different methodologies. In one embodiment, the vendor computer device 110 asks the TURN system 105 where to place the update materials. The TURN system 105 provides a location in an update repository 130 for the vendor computer device 110 to place the update materials. In another embodiment, the vendor computer device 110 uploads the update materials into an update repository 130. Then the vendor computer device 110 notifies the TURN system 105 as to where the update materials are located. The update repository 130 could be on associated with the vendor or one associated with the TURN system 105. In a further embodiment, the vendor computer device 110 sends the update materials to the TURN system 105 and the TURN system 105 determines where to put the update materials in the update repository 130.

As described above, the update materials are not necessarily hosted by the TURN system 105, but instead may be stored in an update repository 130 associated with the vendor. Using the aforementioned PKI trust between entities allows the operator computer device 120 to fetch and trust the externally available update materials. In at least one embodiment, the update information in the update notification can be stored in a Merkle tree. A Merkle tree is a tree where every leaf (node) is labelled with a cryptographic hash of a data block, and every node that is not a leaf (branch, inner node, inode) is labelled with the cryptographic hash of the labels of its child nodes. The Merkle tree allows for efficient and secure verification of the contents of a large data structure. For example, the Merkle tree could include version information, indicate which features are affected by the update, and any other update information desired. The root hash of the Merkle tree can be signed and/or co-signed by the TURN system 105 and/or the vendor computer device 110. This allows the TURN system 105 to have a single hash that represents the update information and/or update materials.

In some further embodiments, the TURN system 105 can also handle changes in vendor. For example, if one company purchases a vendor or a vendor assigns the update management to another company, the TURN system 105 can track that and allow the new vendor to provide the updates. As long as the new vendor has the appropriate keys and recognition information, the TURN system 105 will process their updates without requiring the operator computer device 120 and/or device 125 to make changes.

In some embodiments, the TURN system 105 supports multiple "configurable" channels of updates. These channels allows for different materials, notifications, and notification frequencies, potentially even with different vendors for the same device. In one example, the TURN system 105 supports two channels. The first channel provides for less frequent update notifications, where the update notifications are held until the corresponding update is determined to be stable. This determination may be based on a specific period of time passing and/or a certain number of or percentage of successfully performed updates reported. The second channel would be for more frequent and potentially less stable updates. In this channel, the TURN system 105 would provide update notifications as soon as they were received from the vendors. In another example, the TURN system 105 supports three channels, one for software image updates only, one for configuration data updates only, and one channel for both.

In some further embodiments, the update information includes a manifest for the update. The manifest can include, but is not limited to, firmware/software details (link to location in update repository 130 (URL), size, hash), firmware/software requirements, upgrade target, downgrade target, validity for upgrade, type of upgrade (code, credentials, trust anchors, application, etc.), and signature(s). The signature(s) can be that of the vendor and/or the TURN system 105. Furthermore, if the manifest includes a signature of the code image of the update that is stored in the update repository 130, then the manifest is cryptographically bound to the code image.

In some further embodiments, the TURN system 105 is directly associated with an operator network 115, where the TURN system 105 is operated to coordinate updates for the devices 125 in the network 115. In these embodiments, the TURN system 105 can be managed by the operator computer device 120.

In still further embodiment, the TURN system 105 can also include policy information to provide business and systems logic to guide the update processes.

FIG. 2 illustrates a block diagram of a second system architecture 200 for providing secure updates to devices 125 in accordance with at least one embodiment. In system architecture 200, the operator network 115 (shown in FIG. 1) has been replaced with a local network 205. The local network 205 could be a home network or a business network. In the exemplary embodiment, the local network 205 includes a gateway 210 and one or more devices 125.

In some embodiments, the individual devices 125 have subscribed to the TURN system 105. In other embodiments, the gateway 210 has detected the various devices 125 on the local network 205 and subscribed to the TURN system 105 for the connected devices 125. The devices 125 can include computers, laptops, PDAs, smart devices, Internet of Things (IoT) devices, network elements, and/or any other device 125 that may require updates and/or patches. In other embodiments, gateway 210 can also be at other layers for aggregation. In some embodiments, the gateway 210 could also be a network gateway, a modem, or an access point, etc. In still further embodiments, the gateway 210 can also be an application-level hub that orchestrates a home IoT environment (such as an Alexa for Amazon devices, SmartThings hub, or even a smart phone for management of Apple devices).

In those embodiments where the individual devices 125 have subscribed to the TURN system 105, the individual devices 125 are configured to receive update notifications from the TURN system 105 and then determine when to download and apply the update. The individual devices 125 can download and apply the update immediately or delay the update based on a schedule or to a more advantageous time.

Figure 3:
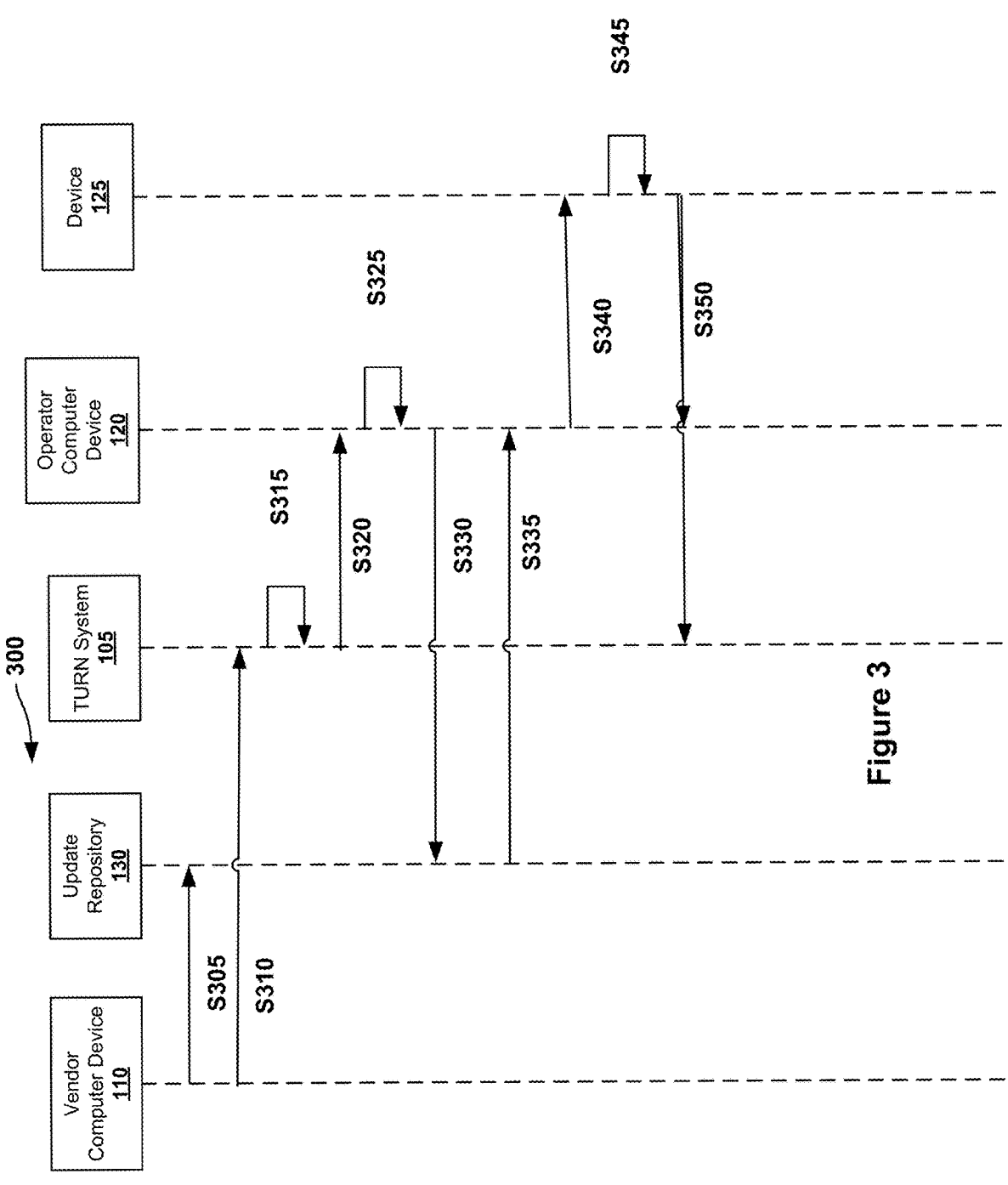
FIG. 3 illustrates a timing diagram of a process for providing secure updates to devices using the system architecture shown in FIG. 1.

FIG. 3 illustrates a timing diagram of a process 300 for providing secure updates to devices 125 using the system architecture 100 (shown in FIG. 1). In the exemplary embodiment, process 300 is used for providing and applying updates to operator networks 115 (shown in FIG. 1) or other managed networks.

Prior to process 300, the operator networks 115 have registered with or subscribed to the TURN system 105 to receive update notifications. In some embodiments, the operator network 115 registers for update notification for the devices 125 that it has in its network. In some embodiments, this registration may be for specific devices 125 or just device types. In the exemplary embodiment, the registration information about each operator network 115, including the corresponding operator computer device 120 to transmit update notifications to, is stored in a database associated with the TURN system 105.

In step S305, a vendor computer device 110, uploads an update to an update repository 130. The update can include files and/or images for uploading or imaging devices 125 to bring the device 125 to the most current or desired version.

In step S310, the vendor computer device 110 transmits an update notification to the TURN system 105. In the exemplary embodiment, the vendor computer device 110 has authenticated the TURN system 105 and the TURN system 105 has authenticated the vendor computer device 110, such as by using a public key infrastructure (PKI). The update notification includes information about the vendor, information to identify the devices 125 and/or software programs that the update is for, and a link to the location of the update in the update repository 130.

In other embodiments, the update notification includes the update materials and the TURN system 105 stores the update materials in the update repository 130. In still further embodiments, some vendors have and maintain their own update repository 130, while other vendors store their update materials in the update repository 130 associated with the TURN system 105.

In step S315, the TURN system 105 analyzes the update notification. The TURN system 105 determines which operator networks 115 have registered for updates from the vendor computer device 110 for the specific device(s) 125 associated with the update notification. In step S320, the TURN system 105 transmits update notifications to each determined operator computer device 120 that registered for or subscribed to updates for the device(s) 125 associated with the update notification.

In step S325, the operator computer device 120 analyzes the update notification and determines when to apply the update to the devices 125. In some embodiments, the operator computer device 120 schedules the update for a subsequent time. In other embodiments, where the update is urgent and/or the update will not require the devices 125 to be offline for any significant period of time, the operator computer device 120 determines to perform the update immediately.

In step S330 the operator computer device 120 requests the update materials from the update repository 130. In step S335, the update repository 130 transmits the update to the operator computer device 120. The update can include a file, a series of files, a container, or other methodology for delivering the update to the operator computer device 120. The operator computer device 120 can also assign another computer device to perform the update. In the exemplary embodiment, the operator computer device 120 only has to retrieve the update materials once from the update repository 130, rather than downloading the update materials multiple times.

In step S340 the operator computer device 120 transmits or provides the update to the device 125 to be updated. In some of these embodiments, the devices 125 and/or the operator network 115 have specific rules and/or procedures for updating devices 125 and the operator computer device 120 is capable of updating the devices 125 in accordance with those rules and/or procedures. In step S345, the device 125 performs the update.

In some embodiments, in step S350, the device 125 reports the success and/or failure of the update to one or more of the operator computer device 120 and/or the TURN system 105. In some embodiments, the TURN system 105 stores the reports of success and/or failure of updates and provides this information in the update notification. In some embodiments, the reports are forwarded to the vendor. In some further embodiments, certain operator networks 115 will only apply updates after those updates have been out for a while and have a certain percentage of reported successful updates being performed. Furthermore, repeated reports of update failures may be reported to the vendor and/or cause the TURN system 105 to add warnings to the update notification. In addition, the update reports can also be reported to the operator computer device 120 to allow the operator computer device 120 and/or any associated management systems, to know if there are issues with the updates. This can assist an operator in determining whether or not to roll the update out to all of the associated devices 125 or how successful the roll out of the update was for the devices 125 on the network 115.

In some of these embodiments, the TURN system 105 can aggregate and report the success and failure of the updates across multiple devices 125 across multiple networks 115. This can assist operators in determining whether or not to roll out updates and to let the vendors know when there may be an issue with the update and/or update materials. For example, if there are a significant number of failures, the TURN system 105 may provide warnings with the notifications and/or with the update materials.

In some situations an update may cause problems, such as by introducing a security vulnerability in the device 125. In these situations, a vendor may issue a recall or rollback on the update. In these situations, the vendor computer device 110 transmits S310 an update notification to the TURN system 105 that states that devices 125 should have their software/firmware rolled back to a previous version. The TURN system 105 transmits S320 the update notification to the operator computer devices 120. Then the operator computer devices 120 can decide whether or not to rollback the devices 125 on their operator network 115. In some embodiments, the operator computer device 120 retrieves S330 the previous update version to install on the devices 125. In other embodiments, the operator computer device 120 still has a copy of the previous version and uses that to update the corresponding devices 125.

In some of these situations, the TURN system 105 and/or the vendor computer device 110 removes the faulty update materials from the update repository 130 to keep other devices 125 from installing the faulty version. For example, if an operator computer device 120 delayed updating its devices 125. If the faulty determination was made between when the original update notification went out and when the operator computer device 120 prepared to download the update materials, the update materials may no longer be available, and thus the operator network 115 is protected from the faulty update. In some of these embodiments, the TURN system 105 stores a marker indicating that the update version was faulty. In other embodiments, the TURN system 105 leaves the faulty update version in the update repository 130, but includes messages that indicate the issues associated with that update version.

In some further embodiments, the update repository includes a plurality of versions of updates for each device type. In these embodiments, the TURN system 105 can mark those updates versions that are obsolete or insecure, so that they are not downloaded.

In still further embodiments, the TURN system 105 looks for new subscribers that have older or insecure versions of software and/or firmware and notifies them of the needed updates. For example, a registering operator computer device 120 can provide information on the versions of software and/or firmware contained in its connected devices 125. The TURN system 105 can determine which updates that the devices 125 need and provide notifications and links to the operator computer device 120.

The above processes 300 and 400 describe a push based methodology, where the TURN system 105 pushes notifications about updates to the operator computer devices 120 and the devices 125. However, in other embodiments, the TURN system 105 can also support a pull based system, where the operator computer devices 120 and the devices 125 can poll the TURN system 105 to determine if any updates are available for them.

In operator networks 115, such as cable networks, there are a great number of devices 125, whether CPE (customer premises equipment), infrastructure, or support, that require updates. As described above, the TURN system 105 can provide a standard process for the secure provisioning and verification of update materials for these devices 125. In the context of cable networks, these update materials are produced by device vendors and provided to operators for provisioning. Currently, this process varies from vendor to vendor. With the TURN system 105, vendors could make operators aware of new updates. Operators could then fetch the update materials and verify them using the authenticity and integrity information provided by the TURN system 105 before provisioning them with existing update processes (e.g. DOCSIS).

In some operator networks 115, different devices 125 of the same type and/or model may have different configurations and software based on the features that are support by the corresponding device 125. For example, a first device 125 may support services A and B, while the second device 125 supports services A and C. When an update is released that relates to or affects service A, then the operator computer device 120 updates both devices 125. However, if an update is released that only affects service C, then the operator computer device 120 updates the second device 125.

Figure 4:
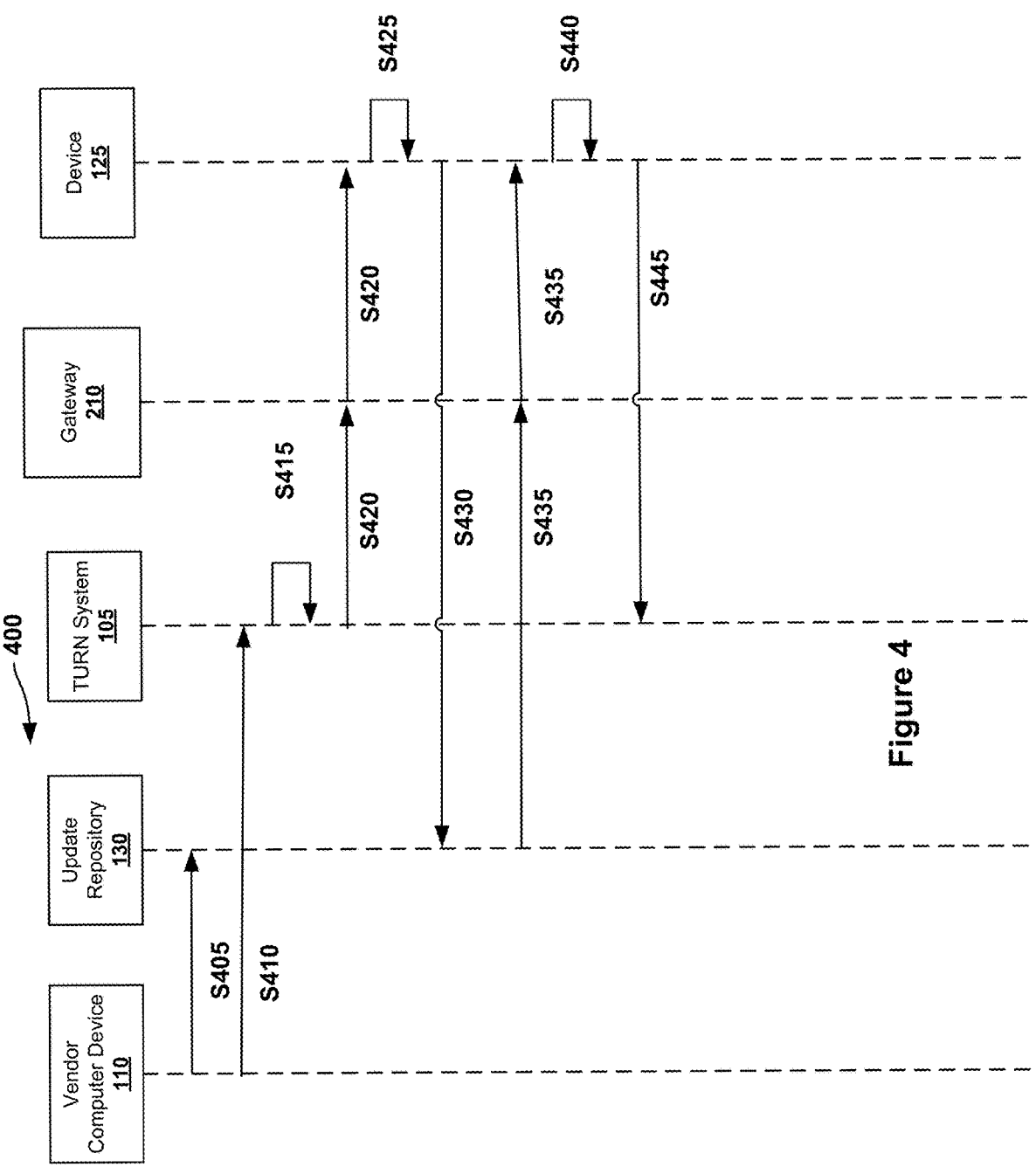
FIG. 4 illustrates a timing diagram of a process for providing secure updates to devices using the system architecture shown in FIG. 2.

FIG. 4 illustrates a timing diagram of a process 400 for providing secure updates to devices 125 using the system architecture 200 (shown in FIG. 2.) In the exemplary embodiment, process 400 is used for providing and applying updates to local networks 205 (shown in FIG. 2) and/or directly to devices 125 themselves. In process 400, the gateway 210 acts as a pass-through network element. In other embodiments, the gateway 210 can act as a device update manager, such as operator computer device 120 (shown in FIG. 1).

Prior to process 400, individual devices 125 have registered with or subscribed to the TURN system 105 to receive update notifications. In the exemplary embodiment, the registration information about each device 125, includes information about the device 125 including, but not limited to, device type, model, serial number, current update or version numbers, etc. The device registration information is stored in a database associated with the TURN system 105.

In step S405, a vendor computer device 110, uploads update materials to an update repository 130. In step S410, the vendor computer device 110 transmits an update notification to the TURN system 105. In the exemplary embodiment, the vendor computer device 110 has authenticated the TURN system 105 and the TURN system 105 has authenticated the vendor computer device 110, such as by using a public key infrastructure (PKI). The update notification includes information about the vendor, information to identify the devices 125 and/or software programs that the update is for, and a link to the location of the update in the update repository 130.

In other embodiments, the update notification includes the update materials and the TURN system 105 stores the update materials in the update repository 130. In still further embodiments, some vendors maintain their own update repository 130, while other vendors store their updates in the update repository 130 associated with the TURN system 105.

In step S415, the TURN system 105 analyzes the update notification. The TURN system 105 determines which devices 125 that the update is for and that have registered for updates. In step S420, the TURN system 105 transmits update notifications to the devices 125 that registered for or subscribed to updates associated with the update notification.

In step S425, the device 126 analyzes the update notification and determines when to apply the update. In some embodiments, the device 125 schedules the update for a subsequent time. In other embodiments, such as where the update is urgent and/or the update will not require the device

125 to be offline for any significant period of time, the device 125 determines to do the update immediately.

In step S430 the device 125 requests the update materials from the update repository 130. In step S435, the update repository 130 transmits the update materials to the device 125. The update materials can include a file, a series of files, a container, or other methodology for delivering the update to the device 125.

In step S440, the device 125 performs the update. In some embodiments, in step S345, the device 125 reports the success and/or failure of the update to the TURN system 105. In some embodiments, the TURN system 105 stores the reports of success and/or failure of updates and provides this information in the update notification. In some embodiments, the reports are forwarded to the vendor. In some further embodiments, certain operator networks 115 and/or devices 125 will only apply updates after those updates have been out for a while and have a certain percentage of reported successful updates being performed.

Update mechanisms are a critical point of maintaining the security of any device 125. The TURN system 105 can allow any device 125 to implement a secure update mechanism. An example ecosystem that is greatly in need of a standardized update mechanism is that of the Internet of Things (IoT). As the TURN system 105 supports many different possible deployment architectures, operators can also offer update support for consumer devices 125 beyond operator-deployed CPE. An operator-hosted instance of the TURN system 105 can, for example, host update materials that various IoT devices 125 can leverage, enabling an operator to provide secure update support beyond cable equipment.

The above processes 300 and 400 describe a push based methodology, where the TURN system 105 pushes notifications about updates to the operator computer devices 120 and the devices 125. However, in other embodiments, the TURN system 105 can also support a pull based system, where the operator computer devices 120 and the devices 125 can poll the TURN system 105 to determine if any updates are available for them or their devices 125.

In the exemplary embodiment, each type/class of device 125 is uniquely identified. This may include identifiers for the specific features that are being used by the individual device 125. This may require that the two devices 125 of the same device type are different because of the features that each supports. The different features can then be supported by different firmware and/or software for effectively the same hardware. The TURN system 105 would then have different identifiers based on the device hardware and firmware/software versions. For a managed system, such as that shown in FIG. 1, the operator computer device 120 is responsible for letting the TURN system 105 know which specific versions of the devices 125 are in its network 115.

Upon initialization the devices 125 can contact the TURN system 105 to determine if there have been any updates since the last time the device 125 was active. In managed systems, such as FIG. 1, the update requests upon initialization can be managed by the operator computer device 120. In systems where the devices 125 are in direct communication with the TURN system 105, such as those in FIG. 2, upon initialization the individual devices 125 can reestablish/reconfirm their subscriptions to the TURN system 105.

Figure 5:
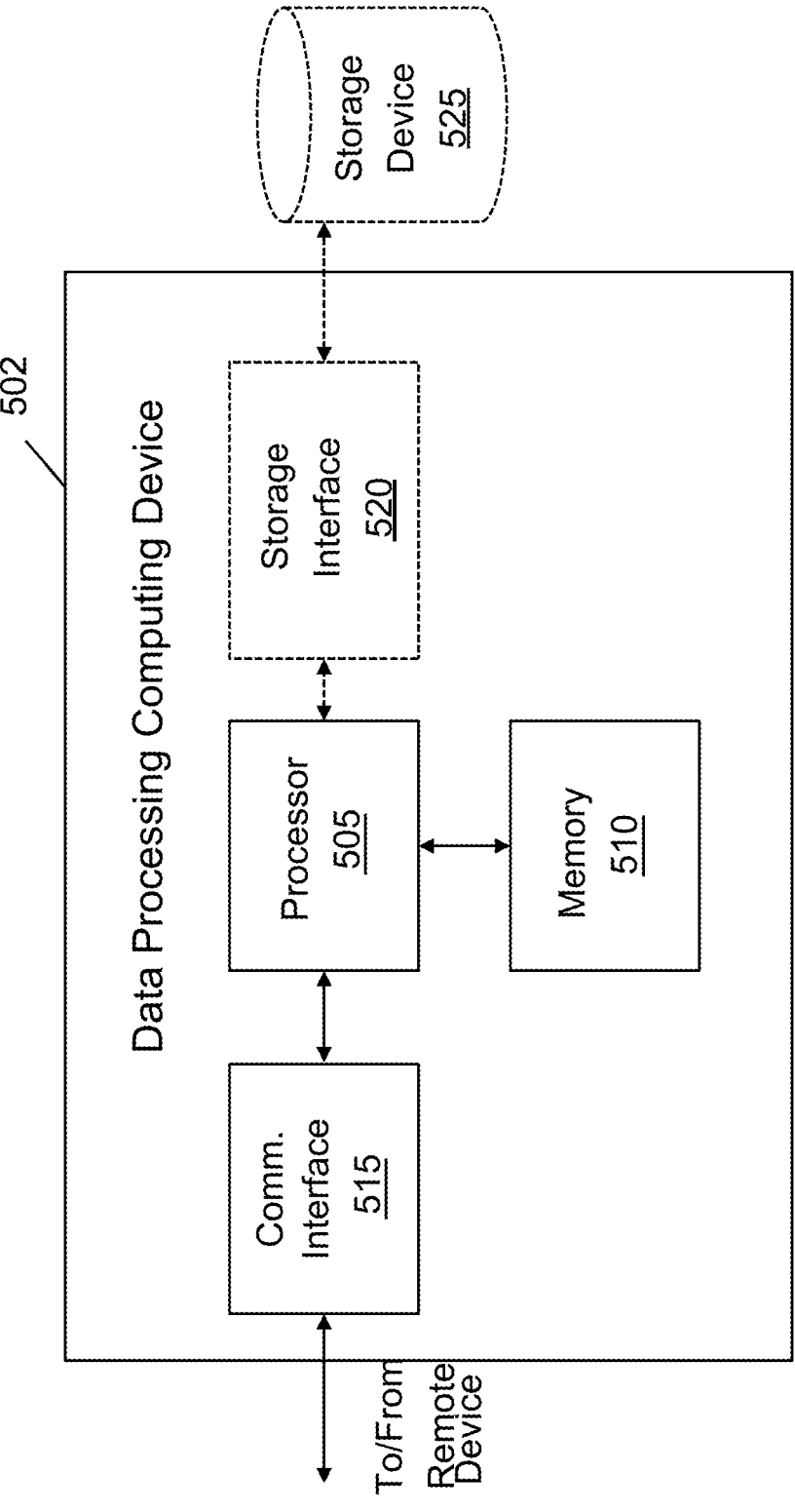
FIG. 5 illustrates a block diagram of an embodiment of a computer system or cloud server in which the present disclosure may be implemented.

FIG. 5 illustrates a schematic block diagram of an embodiment of a data processing system 500. In the exemplary embodiment depicted in FIG. 5, data processing system 500 may represent a computer system or cloud server in which one or more of the above-described embodiments may be implemented.

It should be appreciated that FIG. 5 provides only an illustration of one implementation and does not imply any limitations with regards to the environments in which different embodiments may be implemented. Many modifications to the depicted environments may be made based on design and implementation requirements.

Exemplary data processing system 500 is therefore intended to be representative of any electronic device capable of executing machine-readable program instructions. Data processing system 500 may be representative of a smart phone, a computer system, PDA, or other electronic devices. Examples of computing systems, environments, and/or configurations that may represented by data processing system 500 include, but are not limited to, personal computer systems, server computer systems, thin clients, thick clients, hand-held or laptop devices, multiprocessor systems, microprocessor-based systems, network PCs, mini-computer systems, and distributed cloud computing environments that include any of the above systems or devices.

Accordingly, data processing system 500 may include a processor 505 for executing instructions. Instructions may be stored in a memory area 510. Processor 505 may include one or more processing units (e.g., in a multi-core configuration).

Processor 505 may be operatively coupled to a communication interface 515 such that data processing system 500 is capable of communicating with a remote computing device. For example, data processing system 500 may receive messages and/or events from outside systems, such as through the vendor computer device 110 or the TURN system 105 (both shown in FIG. 1) via the Internet and/or over a computer network.

Processor 505 may also be operatively coupled to a storage device 525 (e.g., certificate databases and/or credentials databases). Storage device 525 may be any computer-operated hardware suitable for storing and/or retrieving data. In some embodiments, storage device 525 may be integrated in data processing system 500. For example, data processing system 500 may include one or more hard disk drives as storage device 525. In other embodiments, storage device 525 may be external to data processing system 500 and may be accessed by a plurality of data processing systems 500. For example, storage device 525 may include a storage area network (SAN), a network attached storage (NAS) system, and/or multiple storage units such as hard disks and/or solid-state disks in a redundant array of inexpensive disks (RAID) configuration.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 525.

A challenge related to the secure provisioning of update materials is that of SBOM and dependency resolution. Software consists of components, which may in turn have dependencies. An SBOM is a nested inventory for software, a list of ingredients that make up software components. In the same way that the TURN system 105 can be used to organize authenticity and integrity materials related to software components, the TURN system 105 can also be leveraged to provide a structured SBOM that describes the software as a whole, including the authenticity and integrity verification materials for each component and dependency. In these embodiments, the SBOM is structured as a Merkle tree. This allows the SBOM to be uniquely identifiable via root hash. This also supports finer granularity as the Merkle tree can be supported as a tree of tree that includes the SBOM and its dependency resolution. At coarser levels of granularity higher level "service" descriptions could be stored. In order of granularity from high to low: Service>SBOM>resolved dependencies.

For example, the SBOM could be structured as a tree with top level containing the purpose of the software in a coarse, generic description (SSH Server). The next level could include the listing of the actual software needed to fulfil the purpose listed in the above level (OpenSSH and Cert-Manager). Then the next level could contain the resolved dependencies for the software, such as libraries (OpenSSL, Libcrypto, Libx509).

Leveraging the Merkle tree structure that the TURN system 105 provides can also enable verification of what specific software is on a device. The single root hash of the structure acts in this case as the unique identifier for which sets of components and dependencies are in use. Further, this structure can be applied at finer levels of granularity, where an entire device's software manifest consists of a Merkle tree of Merkle trees, each of which can be individually inspected and verified, such as described above.

The TURN system 105 can also be leveraged to abstract the level above the actual manifest, providing a means to describe generic services in terms of their components and necessary dependencies. For example, a VPN service could be described in terms of the software required and its dependencies. In this case the TURN system 105 serves as the repository of known services and their dependencies. Under this scheme, a device 105 that aims to provide a certain service can receive the necessary SBOM from the TURN system 105 and securely fetch and validate the necessary components that make up that service. This could be particularly useful for highly distributed and virtualized service-oriented architectures.

While the TURN system 105 is described in regards to updates for operator networks 115, the systems and methods described herein can also be used for updated a plurality of different devices 125 that need software and/or firmware updates or even configuration updates in a secure, trusted manner. For example, the devices 125 can include, but are not limited to, computer devices, smart devices, IoT devices, cellular phones, PDAs, vehicles, and/or any other device 125 in need of updates. Furthermore, the TURN system 105 can also be used for providing software updates, such as those for operating systems, word processing programs, spreadsheet programs, mail programs, emulators, video games, and/or any other type of software program that needs updates, either to change features and/or to update security.

As an alternative to the TURN system 105 provisioning update materials that consist of files and images, the TURN system 105 could instead provide update materials that represent individual configuration values to be used in configuring a device. When constructed as a Merkle tree, the configuration of a device 125 could be securely provisioned and validated by the device 125 before being applied.

Another potential extension of the TURN system 105 is that of network authentication based on the update status of a device 125. Effectively, this extension would leverage the TURN system 105 as a mechanism of Extensible Authentication Protocol (EAP) during initial network onboarding, allowing the network to require a device to meet a version or update requirement before being considered authenticated.

In some embodiments, the TURN system 105 for secure updates includes a TURN computer device. The TURN computer device includes a transceiver configured for operable communication with at least one operator computer device 120 of a communication network 115 and via a connection with at least one vendor computer device 110 (all shown in FIG. 1). The TURN computer device also includes a processor 505 including a memory 510 configured to store computer-executable instructions (both shown in FIG. 5). When executed by the processor 505, the instructions cause the processor 505 to perform actions, such as those described in process 300 and process 400 (shown in FIGS. 3 and 4).

The TURN system 105 stores a plurality of registration information for the at least one operator computer device 120. The operator computer device 120 registered for notifications for one or more device types. The device types can include type, model, serial number range, and/or other information to identify the devices 125 that are appropriate for each update.

The TURN system 105 receives, from a first vendor computer device 110, an update notification message associated with devices 125 of a first device type. The TURN system 105 determines a link to update materials associated with the update notification message. In the exemplary embodiment, the update materials are stored in the update repository 130 (shown in FIG. 1), which may be managed/maintained by the vendor computer device 110 and/or the TURN system 105. The TURN system 105 determines the link to the update materials stored in the update repository 130. In some embodiments, the TURN system 105 receives, from the first vendor computer device 110, the update materials associated with the update notification message. The TURN system 105 stores the update materials in the update repository 130.

Based on the registration information, the TURN system 105 determines one or more operator computer devices 120 that registered to receive updates for the first device type. The TURN system 105 transmits, to the determine one or more operator computer devices 120, one or more update notification messages including the link to the update materials.

In some further embodiments, the TURN system 105 receives, from a first operator computer device 120 of the one or more operator computer devices 120, a request to download the update materials including the link to the update materials. The TURN system 105 transmits, to the first operator computer device 120, the requested update materials.

In still further embodiments, the connection between the first vendor computer device 110 and the TURN system 105 is mutually authenticated. The communication between the TURN system 105 and the at least one operator computer device 120 is also mutually authenticated.

In additional embodiments, the TURN system 105 receives a plurality of update messages from a plurality of vendor computer devices 110. For each update message, the TURN system 105 determines a device type associated with the corresponding update notification message of the plurality of update messages. For each update message, the TURN system 105 determines one or more operator computer devices 120 registered to receive update notification messages for the corresponding device type.

In yet further embodiments, the TURN system 105 receives registration information for a first operator computer device 120. The registration information includes information about one or more device types associated with the first operator computer device 120. The registration information can include information about the devices 125 to be updated, the operator network 115, and the operator computer device 120. The information can include, but is not limited to, model, serial number range, current update number, or software version number.

In some embodiments, the update notification message includes a manifest for the update. In still further embodiments, the manifest is cryptographically signed by the vendor. The TURN system 105 can also cryptographically co-sign the manifest. The manifest can be stored as a Merkle tree. The manifest can also be stored as a Merkle tree comprising a plurality of Merkle trees. The manifest can also include a cryptographic signature of the update materials.

In still further embodiments, the update notification message is for a rollback, wherein the update notification message includes a previously released version of software and/or firmware to apply to the devices of the first device type. The TURN system 105 removes faulty update materials from the update repository 130 based on the update notification message. The TURN system 105 can also mark update materials as faulty based on the update notification message.

In yet additional embodiments, the operator computer devices 120 receives the update notification message from the TURN computer device 105. The operator computer devices 120 analyze the update notification message to determine when to update the plurality of devices 125 of the first device type. The operator computer devices 120 retrieve the update materials from the update repository 130 using the link in the update notification message. Then the operator computer devices 130 apply the update materials to the plurality of devices 125 of the first type on a schedule based on the analysis.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., digital signatures, certificates, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

The exemplary systems and methods described and illustrated herein therefore significantly increase the security of devices by ensuring that their updates are provided securely from a trusted source. Thus both sides of the connection may be authenticated through the TURN system. This improved security resulting from the present embodiments is therefore considerably advantageous.

The present systems and methods are further advantageous over conventional techniques the embodiments herein are not confined to a single ecosystem, but may instead allow for versatile operation within multiple ecosystems, including the Internet and 5G systems. Accordingly, these novel techniques are of particular value to network engineers who desire to have devices securely deployed and updated.

Exemplary embodiments of systems and methods for secure updates are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computing device for performing secure updates and notifications, comprising:
   a transceiver configured for operable communication with at least one operator computer device of a communication network and via an operable connection with at least one vendor computer device; and
   a first processor including a first memory device configured to store computer-executable instructions, which, when executed by the first processor, cause the first processor to:
   receive, from a first vendor computer device, an update notification message associated with devices of a first device type;
   determine one or more additional operator computer devices that are registered to receive updates for the first device type; and
   transmit, to the determined one or more additional operator computer devices, one or more update notification messages, wherein the one or more additional operator computer devices are configured to determine a subsequent time to update one or more devices of the first device type based upon the one or more update notification messages and a current load of the one or more devices of the first device type.

2. The computing device of claim 1, further comprising an update repository, wherein the instructions further cause the first processor to:
   receive, from the first vendor computer device, update materials associated with the update notification message; and
   store the update materials in the update repository.

3. The computing device of claim 1, wherein the instructions further cause the first processor to:
   receive, from a first operator computer device of the one or more additional operator computer devices, a request to download update materials; and
   transmit, to the first operator computer device, the update materials.

4. The computing device of claim 1, wherein the instructions further cause the first processor to mutually authenticate the connection with the first vendor computer device.

5. The computing device of claim 1, wherein the instructions further cause the first processor to mutually authenticate the communication with the at least one operator computer device.

6. The computing device of claim 1, wherein the instructions further cause the first processor to:
   receive a plurality of update messages from a plurality of vendor computer devices; and
   for each update message of the plurality of update messages, (i) determine a device type associated with the corresponding update notification message of the plurality of update messages, and 11 determine that a first operator computer device of the one or more additional operator computer devices is registered to receive update notification messages for the corresponding device type.

7. The computing device of claim 1, wherein the instructions further cause the first processor to receive registration information for a first operator computer device of the one or more additional operator computer devices, and wherein the registration information includes information identifying one or more device types associated with the first operator computer device.

8. The computing device of claim 1, wherein the update notification message include at least one of model number, a serial number range, a current update number, and a software version number.

9. The computing device of claim 1, wherein the update notification message includes at least one vendor-based cryptographic signature.

10. The computing device of claim 1, wherein the update notification message includes a cryptographic signature of update materials.

11. The computing device of claim 1, wherein the update notification message (i) is for a rollback, and (ii) includes a previously released version of software and/or firmware to apply to the devices of the first device type, wherein the one or more additional operator computer devices are configured to determine instruct one or more devices of the first device type to update to a previously released version of software and/or firmware.

12. The computing device of claim 1, wherein the instructions further cause the first processor to:

remove faulty update materials from an update repository based on the update notification message; and store a placeholder for the faulty update materials indicating that a version of software and/or firmware exists and that the version is vulnerable.

13. The computing device of claim 1, wherein the instructions further cause the first processor to:

mark update materials as faulty based on the update notification message; and prevent any download of the faulty update materials.

14. The computing device of claim 1, wherein a first operator computer device of the one or more additional operator computer devices includes at least one second processor in communication with at least one second memory device having programming configured to cause the second processor to:

receive the update notification message from the computing device; and analyze the update notification message to determine when to update a plurality of devices of the first device type.

15. The computing device of claim 14, wherein the programming further causes the second processor to retrieve update materials from an update repository using the update notification message, and wherein the programming further causes the second processor to apply the update materials to the plurality of devices of the first device type on a schedule based on the analysis of the update notification message.

16. A method for performing secure updates and notifications, the method implemented by a first processor in communication with a first memory device, with at least one operator computer device of a communication network, and with at least one vendor computer device, the method comprises:

receiving, from a first vendor computer device, an update notification message associated with devices of a first device type;

determining one or more additional operator computer devices that are registered to receive updates for the first device type; and transmitting, to the determined one or more additional operator computer devices, one or more update notification messages, wherein the one or more additional operator computer devices are configured to determine a subsequent time to update one or more devices of the first device type based upon the one or more update notification messages and a current load of the one or more devices of the first device type.

17. The method of claim 16, wherein the update notification message (i) is for a rollback, and (ii) includes a previously released version of software and/or firmware to apply to the devices of the first device type, wherein the one or more additional operator computer devices are configured to determine instruct one or more devices of the first device type to update to a previously released version of software and/or firmware.

18. The method of claim 16 further comprising:

removing faulty update materials from an update repository based on the update notification message; and storing a placeholder for the faulty update materials indicating that a version of software and/or firmware exists and that the version is vulnerable.

19. The method of claim 16 further comprising:

marking update materials as faulty based on the update notification message; and preventing any download of the faulty update materials.

20. The method of claim 16 further comprising wherein a first operator computer device of the one or more additional operator computer devices is programmed to perform the steps of:

receiving the update notification message from the first processor; and analyzing the update notification message to determine when to update a plurality of devices of the first device type.

* * * * *